United States Patent [19]

Hüper et al.

[11] 3,910,825

[45] Oct. 7, 1975

[54] WATER-INSOLUBLE PEPTIDE MATERIALS

[75] Inventors: Fritz Hüper; Erich Rauenbusch; Günter Schmidt-Kastner, all of Wuppertal; Bruno Bömer, Leverkusen; Herbert Bartl, Odenthal-Hahnenberg, all of Germany

[73] Assignee: Bayer Aktiengesellschaft, Leverkusen, Germany

[22] Filed: Mar. 28, 1973

[21] Appl. No.: 345,792

[30] Foreign Application Priority Data
Mar. 30, 1972 Germany............................ 2215539

[52] U.S. Cl.................. 195/116; 195/36 P; 195/63; 195/68; 195/DIG. 11; 260/112 R
[51] Int. Cl.[2].. C12B 1/00; C07G 7/02; C12D 13/02
[58] Field of Search....... 195/63, 68, 36 P, DIG. 11, 195/116; 260/78.5 R, 112; 424/94, 21

[56] References Cited

UNITED STATES PATENTS

| | | | |
|---|---|---|---|
| 3,576,760 | 4/1971 | Gould et al. | 424/94 X |
| 3,577,512 | 5/1971 | Shepherd et al. | 424/21 |
| 3,650,901 | 3/1972 | Katchalski et al. | 195/63 |
| 3,764,477 | 10/1973 | Lehmann et al. | 195/63 |
| 3,775,253 | 11/1973 | Dieter et al. | 195/63 |

*Primary Examiner*—David M. Naff
*Attorney, Agent, or Firm*—Depaoli & O'Brien

[57] ABSTRACT

Peptide materials such as enzymes and enzyme inhibitors are rendered water-insoluble by binding the peptide materials to a cross-linked copolymer formed by copolymerizing the following units: (A) about 0.1 to 50 weight percent of at least one $\alpha, \beta$-monoolefinically unsaturated dicarboxylic acid anhydride having about 4 to 9 carbon atoms and (B) about 99.9 to 50 weight percent of at least one di- and/or poly(meth)acrylate of a diol and/or a polyol.

28 Claims, No Drawings

WATER-INSOLUBLE PEPTIDE MATERIALS

BACKGROUND OF THE INVENTION

1. Field of the Invention

The invention relates to new water-insoluble protein and polypeptide preparations in which a protein or polypeptide is bound to a copolymer, to a process for the production of these new water-insoluble preparations, and to their use for carrying out enzyme-catalyzed conversions.

2. Description of the Prior Art

The covalent bonding of substances to insoluble polymeric carriers has become more important in recent years. The binding of catalytically active compounds, for example, enzymes, offers particular advantages since they can, in this form, easily be separated off after completion of the reaction and be repeatedly re-used.

Copolymers of maleic anhydride and vinyl compounds have been repeatedly proposed as carriers with suitable binding groups. However, copolymers of maleic anhydride with ethylene and monovinyl compounds become more or less water-soluble on reaction with aqueous enzyme solutions so that before or during the reaction an additional cross-linking agent, for example, a diamine, is desirably added. Enzyme preparations obtained in this way are relatively difficult to filter and possess soluble constituents, and losses of bound enzyme result (compare E. Katchalski, Biochemistry 3, (1964), pages 1905–1919).

Further, copolymers of acrylamide and maleic acid have been described, which are converted into the anhydride form by subsequent heating. These products are relatively slightly cross-linked, swell very markedly in water and only possess moderate mechanical stability, which leads to abrasion losses when using these resins (compare German Offenlegungsschrift 1,908,290).

Furthermore, strongly cross-linked carrier polymers have been produced by copolymerization of maleic anhydride with divinyl ethers. Because of the alternating type of copolymerization of the monomers, these polymers contain a very high proportion of anhydride groups — in each case above 50% by weight of maleic anhydride, in the examples disclosed — which is determined by the molecular weight of the vinyl ether monomer, and is therefore only adaptable to the particular end use within relatively narrow limits (compare German Offenlegungsschrift 2,008,996).

We have therefore attempted to find new reaction products of proteins and peptides with new, strongly cross-linked, water-swellable copolymers possessing a content of cyclic dicarboxylic acid anhydride groups capable of great variation, and a convenient process for their production. Such new reaction products of proteins and peptides with the new copolymers should not have the disadvantages of the previously known protein preparations or should only have them to a slighter extent.

SUMMARY OF THE INVENTION

We now provide, according to this invention, a water-insoluble preparation comprising a peptide material bound to a cross-linked copolymer comprising the following copolymerized units:

A. 0.1 to 50 weight percent of at least one $\alpha,\beta$-olefinically unsaturated dicarboxylic acid anhydride having 4 to 9 carbon atoms;

B. 99.9 to 50 weight percent of at least one di- and/or poly(meth)acrylate of a diol and/or a polyol as hereinafter defined;

the said copolymer having a bulk volume of 1.4 to 30 ml/g and a specific surface area of 1 to 500 $m^2/g$, and containing, after saponification of the anhydride groups, 0.02 to 10 milliequivalents of acid per gram.

The copolymer preferably contains 2–20 weight percent of units A and 80–98 weight percent of units B and the preferred acrylate is a methacrylate.

In this specification the term "peptide material" includes proteins, polypeptides, oligopeptides, and amino acids.

According to the invention we further provide a process for the production of the new preparations defined above, in which, relative to the total weight of monomers, A. 0.1 to 70 weight percent of the said at least one anhydride and B. 99.9 to 30 weight percent of the said acrylate; are copolymerized by precipitation or bead polymerization in a diluent inert to anhydride groups at 20° to 200°C in the presence of a free-radical initiator and the copolymer thus produced is reacted in aqueous suspension with a solution of the peptide material to give the desired preparation.

Finally, according to the invention, we also provide a process for carrying out an enzyme-catalyzed conversion of a substrate comprising contacting a preparation as defined above with a substrate for the enzyme under conditions where the conversion occurs.

The production of the copolymers required as starting materials for the production of the preparations according to the invention will first be particularly described.

Important examples of the $\alpha,\beta$-monoolefinically unsaturated dicarboxylic acid anhydrides with 4–9 carbon atoms, preferably with 4–5 carbon atoms, which are required to provide the units A in the copolymers, are maleic anhydride, itaconic anhydride and citraconic anhydride, especially maleic anhydride. Mixtures of these anhydrides can also be used for the copolymerization.

The diols and polyols from which the dimethacrylates, polymethacrylates, diacrylates and polyacrylates used to provide units B in this invention are derived comprise the following categories of compounds:

i. at-least-dihydroxy compounds with at least two alcoholic or phenolic, preferably alcoholic, hydroxyl groups;

ii. the reaction products of the at-least-dihydroxy compounds (i) with alkylene oxides having 2–8, preferably 2–4 carbon atoms, or mixtures of such alkylene oxides, 1–$10^4$, preferably 1–20, alkylene oxide units being added to 1 mol of the at-least dihydroxy compound (i). Examples of suitable alkylene oxides are ethylene oxide, propylene oxide, butylene oxide, trimethylene oxide, tetramethylene oxide, bis-chloromethyl-oxacyclobutane and styrene oxide, ethylene and propylene oxides being preferred;

iii. the reaction products of at least one of the alkylene oxides defined in (ii) with a compound having at least two Zerewitinoff-active hydrogen atoms which is not an alcohol or a phenol.

The di- and poly-(meth)acrylates of diols and polyols, to be employed according to the invention, can be obtained in accordance with known methods, for example, by reaction of the diols and/or polyols with (meth)acrylic acid chloride in the presence of about equimolar amounts, relative to acid chloride, of tertiary amines such as triethylamine, at temperatures below 20°C, in the presence of benzene (compare German Offenlegungsschrift 1,907,666).

The diols and polyols used in the invention to provide the units B, preferably have 2–12 carbon atoms; examples of them are ethylene glycol, 1,2-propanediol, 1,3-propanediol, butanediols (especially 1,4-butanediol), hexanediols, decanediols, glycerine, trimethylolpropane, pentaerythritol, sorbitol, sucrose and their reaction products with alkylene oxides, as indicated above. Poly-bis-chloromethyl-oxacyclobutane or polystyrene-oxide are also suitable. Mixtures of diols and polyols can also be employed to produce the acrylates.

Preferably, diacrylates or dimethacrylates of diols with 2–4 carbon atoms, or reaction products of one mol of such diols with 1–20 mols of alkylene oxide with 2–4 carbon atoms, or trimethylolpropane trimethacrylate are used. Mixtures of those monomers can also be used.

The dimethacrylates of polyalkylene glycols with molecular weights of up to 1,000 (especially ethylene glycol, diethylene glycol, triethylene glycol and tetraethylene glycol), or mixtures thereof, are particularly advantageous.

If desired it is also possible to add, in addition to the di- and/or poly-(meth)acrylates to be used according to the invention, a cross-linking agent having at least 2 non-conjugated double bonds (e.g. divinyl adipate, methylene-bis-acrylamide, triacrylformal or triallyl cyanurate) to the monomer mixture in amounts of 0.01 to 30% by weight.

Because of the range of variation in the composition of the monomer mixtures, the hydrophilic character, density of cross-linking, swellability and anhydride group content of the copolymers according to the invention they can be adapted to give optimal results in the intended particular end use of the preparation over a very broad range.

The polymerization can be carried out, for example, in an organic solvent, as a precipitation polymerization, in which case the polymers start to precipitate shortly after the start of the polymerization. Inherently, all solvents which are inert towards anhydride groups are suitable. Particularly advantageous solvents are aliphatic, cycloaliphatic and aromatic hydrocarbons and halogen-substituted hydrocarbons, alkyl-aromatic compounds and carboxylic acid esters.

As examples of suitable organic solvents there may be mentioned heptane, octane, isooctane, benzine fractions with boiling points of 60° to 200°C, cyclohexane, benzene, toluene, xylenes, chlorobenzene, dichlorobenzenes, ethyl acetate and butyl acetate.

The solvent used should preferably possess a boiling point of at least 60°C and should be easily removable from the precipitation polymer in vacuo. For 1 part of the monomer mixture, about 2–50, preferably 5–20, parts by weight of the solvent are used. The properties of the copolymers, especially the bulk density and the specific surface area, are significantly influenced by the nature and amount of the solvent.

In many cases it is advantageous to use mixtures of the above-mentioned solvents or to start the polymerization in a solvent for the polymer and continuously to add a precipitant for the polymer over the course of the polymerization. The precipitant can also be added in one or more portions at particular points in time. Furthermore, the monomer mixture can be fed, together with a suitable initiator, as a solution or without solvent, into a previously given amount of solvent, so that during the polymerization a uniform low monomer concentration is maintained. Products with swellability, density and specific surface area suited to the particular end use, and with good mechanical stability, having a very wide range of properties, can be produced by using (meth)acrylic monomers B of differing hydrophilic character and varying the polymerization conditions.

The copolymers used according to the invention can also be produced by suspension polymerization. The most customary type of bead polymerization, in which the monomers, optionally with the addition of an organic solvent, are suspended in water, can in this case only be used with little success, since the anhydride hydrolyses very rapidly and the resulting dicarboxylic acid mainly passes into the water phase only small amounts being incorporated into the polymer. Hence, the suspension polymerization is preferably carried out in an organic medium. The monomers and the initiator are generally dissolved in a solvent which is immiscible with paraffins and inert towards anhydride groups (such as acetonitrile, dimethylformamide, dimethylsulphoxide or hexamethylphosphoric acid triamide), and dispersed in the continuous phase, in most cases with addition of at least one dispersing agent. Paraffin hydrocarbons, such as hexane, heptane, octane and their higher homologues, cycloaliphatic compounds such as cyclohexane, and paraffin mixtures such as benzine fractions or paraffin oil, are particularly suitable as the continuous phase. The volume ratio of continuous phase: monomer phase is generally 1:1 to 10:1, preferably 2:1 to 5:1.

In order to stabilize the suspension it is possible to use, for example, glycerine monooleate and dioleate, as well as mixtures of these compounds, sorbitane monooleate and trioleate or monostearate and tristearate, polyethylene glycol monoethers with stearyl alcohol or lauryl alcohol or nonylphenol, polyethylene glycol monoesters with oleic acid, stearic acid and other fatty acids with more than 10 C atoms, and the Na salt of sulphosuccinic acid dioctyl ester. These stabilizing substances are generally employed in amounts of, preferably 0.1–10% relative to the monomer mixture and are generally dissolved in the hydrocarbon phase. The particle size of the copolymeric product can be reduced either by increasing the speed of stirring or by adding 0.1–2%, relative to monomer, of a further surface-active substance, for example, an alkylsulphonate.

Polymerization in the process of the invention is initiated by radical initiators. Suitable initiators are, for example, azo compounds or per-compounds. The most customary azo compound for initiating the polymerization is azoisobutyronitrile. Possible per-compounds are mainly diacyl peroxides, such as dibenzoyl peroxide or percarbonates such as diisopropyl percarbonate and dicyclohexyl percarbonate, but it is also possible to use dialkyl peroxides, hydroperoxides and redox systems which are active in organic solvents for the initiation.

The initiators are generally added in amounts of 0.01–10 weight percent, preferably 0.1–3 weight percent, relative to the weight of the monomer mixture.

The polymerization is carried out generally at temperatures of 20°–200°C, preferably 50°–100°C, depending on the speed of decomposition of the initiators and, in most cases, below the boiling point of the solvent, and in the case of bead polymerizations below the miscibility temperature of the two phases. Furthermore, it is as a rule advantageous to carry out the polymerization in an inert atmosphere in the absence of oxygen.

The copolymers obtained by precipitation polymerization are colorless to pale yellow-colored powdery substances with bulk volumes of 1.5–30 ml/g, preferably 2–20 ml/g and specific surface areas of 0.1–500 $m^2/g$, preferably 1–400 $m^2/g$. The content of carboxyl groups determined titrimetrically after saponification of the anhydride groups is 0.02–10 mequiv/g, preferably 0.4–4 mequiv/g.

The copolymers obtained by suspension polymerization are white or slightly colored beads which can in some cases be irregular in shape and have a diameter of 0.03–1 mm, preferably 0.05–0.5 mm and bulk volumes of about 1.4–8 ml/g, preferably 1.4–5 ml/g. Their carboxyl group content, determined after hydrolysis of the anhydride groups, is 0.02–10 mequiv/g, preferably 0.4–4 mequiv/g.

The copolymers used according to the invention contain the copolymerized units in statistical distribution. (random copolymer). Because of their high density of cross-linking, they are insoluble in all solvents. Their molecular weights can therefore not be determined.

The copolymers can swell in water to between 1.1 and 2.5 times their bulk volume. They are outstandingly suitable for use as carrier resins for fixing substances which can react with the anhydride groups of the copolymers.

After production of the copolymers, it is combined with the peptide material in a second step. In this step the copolymer is directly introduced, generally at temperatures of between 0° and 30°C, into the aqueous solution of the substance to be bound, preferably while the pH value is kept constant.

If proteins are to be bound to the copolymers according to the invention, the process is appropriately carried out with a pH-stat in a pH range of 3 to 10, preferably of pH 5.5 to pH 9.0. If penicillinacylase is to be bound, the process is appropriately carried out between pH 5.7 and pH 6.8. During the binding reaction, a base should continuously be added to keep the pH range constant. For this it is possible to use both inorganic bases (for example caustic alkali solutions) and organic bases (for example tertiary organic amines).

In contrast to experiences with other resins, described in the literature, according to which the reaction is carried out in buffered solutions, the yields of bound enzyme using the resins described were the better, the lower was the salt content of the solutions.

The weight ratio of bound substance, for example, protein or peptide, to carrier resin can be varied within wide limits and suited to the subsequent end use. Good yields are obtained with a ratio of 1 part by weight of protein to 4–10 parts by weight of polymeric carrier. However, the optimum ratios depend both on the composition and structure of the polymer and also on the nature of the protein. In the case of many enzymes it is desirable to add stabilizers to the enzyme solution.

As such, it is possible to use polyethylene glycols or non-ionic wetting agents to reduce protein denaturing at surfaces, and the known SH reagents or metal ions in the case of special enzymes.

The requisite reaction time depends on the nature of the polymer. In the normal case, the reaction is completed after 20 hours at room temperature. At 4°C, the reaction preferably continues somewhat longer. In preparative batches, the batch is generally stopped not less than 2 hours after completion of addition of alkali by the pH-stat. The polymer with the bound protein is thereafter filtered off or centrifuged off and the residue is washed with salt solutions of high ionic strength, for example 1 M sodium chloride solution, and subsequently with a buffer in which the enzyme is stable. By washing with solutions of high salt concentration, ionically bound protein is detached from the carrier.

In order to assess the success of the binding of the protein, the enzymatic activity was determined, in the case of enzymes, both in the polymer and also in the residual solution and in the wash waters. In the case of proteins without a specific effect, the nitrogen content in the polymer was determined according to Kjeldahl's method. The yields in the binding of the proetin were found to be between 10 and over 90%. If the enzymatic activity is considered, it is advantageous in some cases not to use too great an excess of polymer material since otherwise the activity suffers, though the protein is completely bound.

The carrier copolymers defined above are suitable for binding any substance which carries a functional group which is capable to reacting with the anhydride groups of the polymer. In the case of proteins and peptides these groups are above all the terminal amino groups of lysine and the free amino groups of the peptide chain ends.

Carrier-bound peptides and proteins are of great scientific and industrial importance. The enzymes, which are in most cases expensive and unstable, are considerably stabilized by binding to the resin. Furthermore, the easy and complete recovery of the enzyme resin permits repeated use over long periods of time.

The following substances are examples of peptide materials which can be bound to the copolymers according to the invention:

Enzymes: Hydrolyases such as proteases, for example trypsin, chymotrypsin, papaine and elastase; amidases, for example asparaginase, glutaminase and urease; acyltransferases, for example penicillinacylase; lyases, for example hyaluronidase.

Other proteins: plasma constituents and globulins (antibodies).

Oligopeptides, such as glutathione.

Polypeptides, such as kallikrein inhibitor and insulin.

Aminoacids, such as lysine or alanine.

It is however envisaged that the invention will primarily be used for proteins isolated from bacteria, fungi, actinomycetes or animal material.

Some examples of industrially important reactions with carrier-bound enzymes are the hydrolytic degradation of starch by amylase bound by covalent bonds, the clarifying of fruit juices and others by bound pectinase, the manufacture of enzymatically degraded protein hydrolysis products and the hydrolysis of penicillins to 6-aminopenicillanic acid. Furthermore, bound enzymes, peptides and others have also been used for the isolation of inhibitors by affinity chromatography, and conversely bound inhibitors have been used for the isolation of enzymes. Other uses lie in the field of medicine. One example is the use of bound L-asparaginase or urease in an extra-corporal circulation for reducing the asparagine or urea level in the blood.

These and numerous other possible uses have been described in the literature. On this topic see for example the summaries in Chem. Eng. News of 15-2-1971, page 86 and Rev. Pure a. Appl. Chem. 21, 83 (1971).

An important example of the use of the protein preparations according to the invention is the splitting of penicillins by means of penicillinacylase which is bound to the copolymers according to the invention.

In order to produce 6-aminopenicillanic acid (hereinafter referred to as 6-APA), penicillins can be split by means of acrylases from micro-organisms, including bacteria, especially *E. coli*, Erwinia or Actinomycetes, such as Streptomyces, Micromonospora, and Nocardia, fungi such as Fusarium, and yeasts.

According to the process of German Patent Specification No. 1,111,778 for the production of 6-APA, a penicillin G solution is treated with a bacterial sludge which contains the enzyme penicillinacylase (E.C. 3.5.1.11). As a result of the action of the enzyme, the lateral carbonamide grouping of the penicillin is split off without opening of the β-lactam ring.

The use of such suspensions of micro-organisms has the following disadvantages:

a. The suspension of micro-organisms, in addition to containing the intra-cellular penicillinacylase, contains further proteins and enzymes as well as constituents from the nutrient medium or their transformation products which have been produced during the fermentation. These impurities cannot be completely eluted from the crystalline 6-APA during working-up.

b. The suspension of micro-organisms can only be employed once economically.

c. The suspension of micro-organisms contains impurities and other enzymes which inactivate penicillin and/or 6-APA by opening the β-lactam ring.

d. The suspension only contains small amounts of penicillinacylase. The use of more enzyme material, for example, to achieve shorter reaction times and hence better 6-APA yields with a lower content of extraneous products is not possible in practice.

e. The operating yields of 6-APA depend on the varying formation of penicillinacylase in the individual fermentation batches.

f. The complete removal of suspended micro-organisms requires an additional process step when working-up the 6-APA batches and this causes losses in yield. Further purification steps are necessary to remove protein-like impurities which can cause allergic reactions (British Pat. Nos. 1,169,696; 1,078,847; 1,114,311).

All these disadvantages mentioned can be avoided if instead of a suspension of micro-organisms a penicillinacylase is used which is obtained by covalent bonding to a water-insoluble carrier.

While attempts to manufacture 6-APA by enzymatic splitting of penicillins with carrier-bound penicillinacylase are known (see German Offenlegungsschrift 1,917,057 and German Offenlegungsschrift, German published specification, 1,907,365) it has however not been possible to apply these on a technical scale. The reasons for this are that the mechanical properties of the carrier material used, leads to high abrasion, while with moderate process yields only low specific activities of carrier-bound penicillinacylase were achievable.

The insoluble enzyme used in German Offenlegungsschrift 2,157,970, which was obtained by covalent bonding of the penicillinacylase to a copolymer of acrylamide, N,N'-methylene-bis-acrylamide and maleic anhydride, also has disadvantages for the splitting of penicillin on an industrial scale, since it swells strongly and is mechanically unstable. These disadvantages handicap the repeated re-use of the resin, thus produced, on an industrial scale.

It has now been found that the disadvantages mentioned above can be avoided if a penicillinacylase bound to a water-insoluble carrier according to the invention is used for splitting penicillins.

The splitting of penicillins with carrier-bound penicillinacylase according to the invention can be carried out simply and also on a large industrial scale. In a preferred form of this process, the carrier-bound insoluble enzyme is suspended in a solution containing 75,000–150,000 IU/ml of penicillin, for example penicillin G or penicillin V. The enzymatic splitting is carried out at a constant pH value in the range of 6–9, particularly in the range of the pH optimum of the particular bound penicillinacylase, for example at pH 7.8. To neutralize the acyl radical split off, for example of phenylacetic acid or of phenoxyacetic acid, aqueous alkali solutions, for example potassium hydroxide solution or sodium hydroxide solution, or organic amines, preferably triethylamine, are used. The reaction velocity and the completion of the splitting can be seen from the consumption of the base. The penicillinacylase catalyzes both the splitting of penicillin to give 6-APA and the resynthesis of the penicillins from the splitting products. The equilibrium depends on the pH value of the medium. At lower pH values the equilibrium is displaced in favor of the starting product, penicillin. This can be utilized for the trans-acylation of penicillins in the presence of other acyl radicals or for the synthesis of penicillins from 6-APA.

The reaction temperature of the enzymatic splitting is preferably 38°C. At lower temperatures, the activity of the enzyme decreases. If the splitting is carried out, for example, at 25°C, twice as much enzyme as at 38°C has to be employed if the same reaction times are to be achieved.

At a given temperature, the reaction velocity depends on the specific activity and on the amount of the carrier-bound penicillinacylase. Furthermore, the reaction velocity depends on the ratio of the amount of the carrier-bound penicillinacylase to the concentration of the penicillin. A splitting batch with a concentration of 100,000 IU/ml [1 mg potassium penicillin-G corresponds to 1598 IU (International Units)] of potassium penicillin G has been completely hydrolyzed to 6-APA and phenylacetic acid after 10 hours at pH 7.8 and 38°C if, per unit of penicillinacylase, $3.10^5$ units of penicillin G are employed (one enzyme unit (U) is defined as the activity which hydrolyzes 1 $\mu$ mol of 6-nitro-3 (phenyl-acetyl)-aminobenzoic acid (NIPAB) per minute at 25°C). The proportion of dry enzyme resin is only 0.5–1% of the reaction mixture. If 2 units of penicillinacylase are employed per $10^5$ IU of penicillin G, the complete splitting only requires two hours. Even shorter reaction times are also possible when using even more bound penicillinacylase, when using, for example, carrier-bound penicillinacylase from crystallized enzyme.

The carrier-bound penicillinacylase according to the invention can be produced as beads and is distinguished by high mechanical stability and a comparatively high specific gravity. These properties allow it to be employed for prolonged periods of time if it is repeatedly used. These properties furthermore make it possible, in batch processes, to employ intensive stirring and simple separation by centrifuging without loss through mechanical stress, for example, through abrasion. Thus, batch processes yield clear filtrates which can, without additional filtration, be processed further in order to isolate the end product, 6-APA. The carrier-bound penicillinacylase manufactured according to the invention also permits rapid and simple filtration, since, as a result of the mechanical stability, no very fine particles which block the filter surface are produced. The resin offers further advantages in the batch process because of the comparatively high specific gravity, which causes the resin to settle out rapidly, so that after completion of the process the supernatant solution can easily be siphoned off. This results in a simplification of the conduct of the process, since in the batch process the resin can remain in the reaction vessel and be used directly for the next splitting.

The properties of the polymer further permit the use of the carrier-bound penicillinacylase not only in batch processes but also in continuous processes, for example in reaction columns, where the bead shape makes possible high speed of flow-through.

After separating off the enzyme resin, the 6-APA formed in the enzymatic splitting can be isolated from the reaction solution in accordance with known processes (see, for example, German Patent Specification No. 1,111,778) and crystallized at pH 4.3. In the splitting of penicillin, according to the invention, with the carrier-bound penicillinacylase produced according to the invention, substantially higher yields of 6-APA are obtained then when using E. coli sludge, but also higher yields than when using the enzyme resin according to German Patent Application No. P 21 57 970.4. Thus, as is shown in Examples 8 and 9 below 6-APA has been isolated in a yield of approximately 90% of theory. The 6-APA thus produced does not contain any proteins as impurities. The 6-APA thus produced also contains practically no polymers which can be produced in other procedures. Allergic side-effects attributable to proteins or polymers are impossible with the 6-APA produced according to the invention.

The carrier-bound penicillinacylase produced according to the invention can be used repeatedly over a prolonged period of time. Even thereafter, the enzymatic activity is still retained practically completely.

Our copending Application Number Ser. No. 345,542, filed Mar. 27, 1973, describes and claims preparations generally similar to those of the present invention, except that the copolymer additionally incorporates the residues of a hydrophilic monomer.

The boiling points given in the following Examples were determined at normal pressure.

The following examples illustrate the best mode now contemplated for carrying out the present invention.

EXAMPLE 1a 80 g of tetraethylene glycol dimethacrylate, 20 g of maleic anhydride and 1 g of azoisobutyronitrile are dissolved in 1 Liter of benzene and the mixture is warmed to 60°C for 4 hours, while stirring. 1 g of azoisobutyronitrile and 200 ml of benzine (boiling point 100°–140°C) are then added and the polymerization is continued for 5 hours at 70°C. The pulverulent polymer is filtered off, suspended once is benzene and three times in petroleum ether (boiling point 30°–50°C) and dried in vacuo.

Yield: 94 g
Bulk volume: 3.5 ml/g
Swelling volume in water: 4.7 ml/g
Specific surface area: 5 m²/g
Acid content after saponification of the anhydride groups:
3.5 mequiv/g

EXAMPLE 1b 1 g of carrier resin produced as described in Example 1a is suspended in 30 ml of an aqueous solution of 132 U of pencillinacylase (specific activity 1 U/mg of protein). The suspension is stirred for 20 hours at 25°C while keeping the pH value content at 6.3 by adding 1 N sodium hydroxide solution with a pH-stat. Thereafter the resin is filtered off on a G3 glass frit and washed with 50 ml of 0.05 M phosphate buffer of pH 7.5, containing 1 M sodium chloride, and with 50 ml of the same buffer without sodium chloride. The activity of the resin is not changed further by additional washing.

| Enxymatic activities (NIPAS test) | |
|---|---|
| Starting solution: | 132 U |
| Supernatant liquid + wash water: | 12 U |
| Resin after reaction: | 86 U |
| (ie 65% of the starting activity). | |

The enzymatic activity of the penicillinacylase was determined colorimetrically or titrimetrically with 0.002 M 6-nitro-3-(N-phenylacetyl)-aminobenzoic acid (NIPAB) as the substrate at pH 7.5 and 25°C. The molar extinction coefficient of the resulting 6-nitro-3-aminobenzoic acid is $E_{405\ nm}= 9090$. 1 unit (U) corresponds to the conversion of $1\mu$ mol of substrate per minute.

EXAMPLE 2a

A solution of 90 g of ethylene glycol dimethacrylate 10 g of maleic anhydride and 1 g of azoisobutyronitrile in 1 liter of benzene is initially polymerized at 60°C while stirring. After 4 hours, 200 ml of benzine (boiling point 100°–140°) and 1 g of azoisobutyronitrile are added and polymerization is continued for 2 hours at 70° and 2 hours at 80°C.

Thereafter the polymer is filtered off, thoroughly washed with petroleum ether (boiling point 30°–50°C) and dried in vacuo.

Yield 97 g
Bulk volume: 6.4 ml/g
Swelling volume in water: 8.0 ml/g
Specific surface area: 298 m²/g
Acid content after saponification of the anhydride groups:
1.5 mequiv/g

EXAMPLE 2b 6 g of carrier resin produced as described in Example 2a were reacted analogously to Example 1b with 590 U of penicillinacylase in 165 ml of water.

Result:
Enzymatic activities (NIPAB test)
Starting solution: 590 U
Supernatant liquid + wash water: 26 U
Carrier resin after reaction: 352 U
(ie 60% of the starting activity)

EXAMPLE 2c 1 g of carrier resin produced as described in Example 2a was reacted with 100 mg of asparaginase analogously to Example 1b.

Enzymatic activities (asparagine hydrolysis)
Starting solution: 21,000 U
Supernatant liquid after the reaction: 3,360 U
Carrier resin after the reaction: 3,910 U
(ie 19% of the starting activity)

EXAMPLE 3a

The copolymerization of 90 g of diethylene glycol dimethacrylate with 10 g of maleic anhydride under the conditions of Example 2 a gives the following:
Yield: 96 g
Bulk volume: 5.5 ml/g
Swelling volume in water: 6.7 ml/g
Specific surface area: 9.2 m²/g
Acid content after saponification of the anhydride groups:
1.9 mequiv/g

EXAMPLE 3b 1 g of the carrier resin produced as described in Example 3a was added to a solution of 50 mg of non-specific elastase having an enzymatic activity of 139 U, in 32 ml of water. The batch was stirred for 16 hours at room temperature, while keeping the pH constant at 5.8. After the reaction, the resin was filtered off and washed with 50 ml of 1 N sodium chloride solution in 0.05 M phosphate buffer at pH 7.5, and subsequently with 50 ml of 0.05 M phosphate buffer at pH 7.5.

Result:
Starting solution: 139 U
Supernatant liquid and wash solutions: 51 U
Bound to the carrier resin: 15 U
(ie 11% of the starting activity)

Here, the enzymatic activity was determined titrimetrically with casein as the substrate (concentration 11.9 mg/ml at pH 8.0 and 25°C. 1 unit (U) corresponds to a consumption of 1 $\mu$ mol of potassium hydroxide solution per minute.

EXAMPLE 3c 1 g of the carrier resin produced as described in Example 3 a was added to a solution of 50 mg of crystallized urease (Merck) in 32 ml of water. The batch was stirred for 16 hours at room temperature, while keeping the pH constant at 6.3. Working up took place as indicated in Example 1 b.

Result:
Starting solution: 5,013 U
Supernatant liquid and wash solutions: 1,397 U
Bound to the carrier resin: 1,405 U
(ie 28% of the starting activity)

The enzymatic activity of the urease was determined titrimetrically with 0.17 M urea as the substrate, at 25°C and pH 6.1. 1 unit (U) corresponds to the amount of enzyme which splits 1 $\mu$ mol of urea per minute.

EXAMPLE 3d 0.4 g of carrier resin produced as described in Example 3 a were reacted with 40 mg of glutathione in 32 ml of water for 16 hours at room temperature and at a constant pH value of 6.3. The resin was filtered off and washed with a solution of 1 N sodium chloride in 0.05 M phosphate buffer at pH 7.5 and subsequently with water. After drying the resin in vacuo at 100°C over phosphorus pentoxide, 0.47 g were obtained. The nitrogen determination by Dumas' method gave a value of 1.1% N, corresponding to a content of 8.04% or 37.8 mg of glutathione. This represents 94% of the amount of glutathione employed.

EXAMPLE 4a 80 g of tetraethylene glycol dimethacrylate, 20 g of maleic anhydride and 1 g of azoisobutyronitrile are dissolved in 1 l. of benzene and polymerized for 16 hours at 80°C, with slow stirring. The polymer is worked up analogously to Example 1a.
Yield: 95 g
Bulk volume: 2.5 ml/g
Swelling volume: 3.0 ml/g
Acid content after saponification of the anhydride groups:
2.6 mequiv/g

EXAMPLE 4b

The reaction of 1 g of carrier resin produced as described in Example 4a with penicillinacylase analogously to Example 1b yields the following results:

Enzymatic activities (NIPAB test)
Starting solution: 123 U
Supernatant liquid + wash solutions: 13 U
Carrier resin after reaction: 79 U
(ie 64% of the starting activity).

EXAMPLE 4c 0.4 g of carrier resin produced as described in Example 4 a were added to a solution of 40 mg of trypsin in 32 ml of 0.01 M calcium chloride solution and the mixture was stirred for 16 hours at room temperature while keeping the pH value constant at 6.3. The resin was filtered off and washed in accordance with Example 1b.

Enzymatic activity
In the starting solution: 44 U
In the supernatant liquid and wash solutions: 5.2 U
Bound to the resin: 8.3 U
(ie 19% of the starting activity).

The enzymatic activity was measured colorimetrically according to Tuppy, Z. Physiol. Chem. 329 (1962) 278, with benzoyl-arginine-p-nitro-anilide (BAPNA) as the substrate. 1 unit (U) corresponds to the splitting of 1 $\mu$ mol of substrate at 25°C and pH 7.8.

EXAMPLE 4d 1 g of carrier resin produced as described in Example 4a was added to a solution of 50 mg of non-specific elastase in 32 ml of water. The suspension was stirred for 16 hours at room temperature while keeping the pH value constant at 5.8. The working up and titrimetric determination of the enzyme activities with casein as the substrate was carried out as indicated in Example 3b.

| Enzymatic activity | |
| --- | --- |
| In the starting solution: | 139 U |
| In the supernatant liquid and wash solutions: | 32 U |
| Bound to the resin: | 36 U |
| (ie 26% of the starting activity). | |

EXAMPLE 5a 1 l of benzine (boiling point 100°140°C) and 1 g of azoisobutyronitrile are warmed for 1 hour to 90° in a stirred vessel. A solution of 95 g of ethylene glycol dimethacrylate, 5 g of maleic anhydride and 1 g of azoisobutyronitrile is then added dropwise over the course of 3 hours at 80°C and the mixture is stirred for a further 2 hours at the same temperature.

The polymer is filtered off, repeatedly washed with benzene and petroleum ether (boiling point 30°–50°C) and dried in vacuo.

Yield: 96 g
Bulk volume: 14 ml/g
Swelling volume in water: 18.2 ml/g
Specific surface area: 70 m$^2$/g
Acid content after saponification of the anhydride groups:
0.5 mequiv/g

EXAMPLE 5b 0.4 g of resin produced as described in Example 5 a were stirred with 40 mg of glutathione in 32 ml of water for 16 hours at room temperature while keeping the pH constant at 6.3. The resin was filtered off and washed and dried in accordance with Example 3d. 0.46 g of resin was obtained, containing 0.9% N according to Dumas' method. This corresponds to a content of 6.6% or 30.4 mg of glutathione, that is to say 76% of the amount employed.

EXAMPLE 6a

A solution of 62.5 g of tetraethylene glycol dimethacrylate, 37.5 g of maleic anhydride and 1 g of azoisobutyronitrile in 150 ml of butyl acetate and 1 l of benzine (boiling point 100°–140°C) is polymerized, while stirring, for 2 hours at 70°C, 2 hours at 90°C. The polymer is filtered off, extracted with benzene for 24 hours in a Soxhlet extractor and dried in vacuo.

Yield: 77 g
Bulk volume: 7.3 ml/g
Swelling volume in water: 8.2 ml/g
Specific surface area: 19.4 m$^2$/g Acid content after saponification of the anhydride groups:
4.0 mequiv/g

EXAMPLE 6b

The reaction of 1 g of carrier resin produced as described in Example 6 a with penicillinacylase analogously to Example 1 b gave the following results:

| Enzymatic activities (NIPAB test) | |
| --- | --- |
| Starting solution: | 107 U |
| Supernatant liquid and wash solutions: | 28 U |
| Carrier resin after the reaction: | 55 U |
| (ie 51% of the starting activity) | |

EXAMPLE 7a

A solution of 90 g of tetraethylene glycol dimethacrylate, 10 g of maleic anhydride and 1.0 g of azoisobutyronitrile in 200 ml of acetonitrile is suspended in 1,000 ml of benzine (boiling point 100°–140°C) in which 5 g of a mixture of glycerine monooleate and glycerine dioleate have been dissolved. The reaction mixture is polymerized at 60°C until solid beads are formed (approx. 2 hours) and is subsequently polymerized for 20 hours at 65°C. The polymer is filtered off, suspended three times in benzene and three times in petroleum ether (boiling point 30°–50°C) and dried in vacuo at 50°C.

Yield: 94 g
Mean particle diameter:~0.35 mm
Bulk volume: 2.8 ml/g
Swelling volume in water: 3.1 ml/g
Specific surface area: 3.4 m$^2$/g
Acid content after saponification of the anhydride groups:
1.5 mequiv/g

EXAMPLE 7b

The reaction of 1 g of carrier resin produced as described in Example 7 a with penicillinacylase analogously to Example 1 b gave the following results:

| Enzymatic activities (NIPAB test) | |
| --- | --- |
| Starting solution: | 107 U |
| Supernatant liquid and wash solutions: | 51 U |
| Carrier resin after the reaction: | 19 U |
| (ie 18% of the starting activity). | |

EXAMPLES OF THE SPLITTING OF PENICILLIN

EXAMPLE 8

79 g of moist carrier-bound penicillinacylase with an activity of 687 U (NIPAB test), which was produced according to Example 2b, are stirred with 129 g of potassium penicillin G (purity 98%) in 2,000 ml of water for 9 hours at 38°C. The pH value of the reaction batch is at the same time kept constant at 7.8 by continuous addition of triethylamine. The uptake of triethylamine ceases when the reaction is complete. The carrier-bound penicillinacylase is centrifuged off or filtered off and rinsed with 200 ml of water and 200 ml of 0.2M phosphate buffer at pH 6.5; it is then ready for a new batch. The filtrate, including the wash solutions, is concentrated to 300 ml in vacuo. The 6-APA is precipitated by addition of half-concentrated hydrochloric acid at the isoelectric point at pH 4.3 in the presence of 200 ml of methyl isobutyl ketone. After one hour the product is filtered off, rinsed with 200 ml of water and then with 200 ml of acetone. The 6-APA is dried in vacuo at 40°C; melting point 208°C. The yield of 6-APA is 67.8 g, that is to say 90.5% of theory. Its purity is 98%.

EXAMPLE 9

60 g of moist carrier-bound penicillinacylase with an activity of 673 U (NIPAB test), which has been produced by binding penicillinacylase onto a copolymer of tetraethylene glycol dimethacrylate and maleic anhydride according to Example 1, are stirred with 129 g of potassium penicillin G in 2,000 ml of water for 9 hours at 38°C. The pH value is kept constant at 7.8 by addition of triethylamine. The further working up is carried out as described in Example 8. The yield of 6-APA is 65.3 g, that is to say 87% of theory.

What is claimed is:

1. A water-insoluble preparation comprising a peptide material selected from enzymes and enzyme inhibitors bound to a cross-linked copolymer comprising the following copolymerized units:
   A. 0.1 to 50 weight percent of at least one $\alpha,\beta$-olefinically unsaturated dicarboxylic acid anhydride having 4 to 9 carbon atoms;
   B. 99.9 to 50 weight percent of at least one di- and/or poly-(meth)acrylate of a diol and/or a polyol.

2. A preparation according to claim 1 in which the copolymer also comprises polymerized units derived from 0.01 to 30 weight percent, based on the total monomer units of the copolymer of a cross-linking agent having at least two non-conjugated double bonds.

3. A preparation according to claim 1 in which the copolymerized units A of the copolymer are derived from at least one anhydride selected from maleic, itaconic and citraconic anhydrides, and the polymerized units B of the copolymer are units of at least one acrylate selected from di-(meth)acrylates of diols having 2 to 4 carbon atoms, reaction products of 1 mol of diols having 2 to 4 carbon atoms with 1 to 20 mols of at least one alkylene oxide with 2 to 4 carbon atoms, and trimethylolpropane trimethacrylate.

4. A preparation according to claim 1 in which the copolymerized units A of the copolymer are of maleic anhydride and the copolymerized units B of the copolymer are of a dimethacrylate of a polyethylene glycol having a molecular weight up to 1000.

5. A preparation according to claim 1 in which the peptide material is an enzyme.

6. A preparation according to claim 5 in which the enzyme is penicillinacylase.

7. A preparation according to claim 1 in which the peptide material is an enzyme inhibitor.

8. A process for the preparation of the composition of claim 1 which comprises reacting the following amounts of copolymerizable monomers:
   A. 0.1 to 50 weight percent of the said at least one anhydride and
   B. 99.9 to 50 weight percent of the said acrylate; whereby copolymerization is conducted by precipitation or bead polymerization in a diluent inert to anhydride groups at a temperature of about 20° to 200°C in the presence of a free-radical initiator and the copolymer thus produced is reacted in aqueous suspension with a solution of the peptide material to give the desired preparation.

9. A process according to claim 8 in which the process is carried out by precipitation polymerization in an organic solvent, the organic solvent being present in a proportion of 5 to 20 parts by weight of solvent per part of monomer by weight.

10. A process according to claim 8 in which the copolymerization is carried out by suspension polymerization in an organic medium, the monomers and initiator being dissolved in an organic solvent which is immiscible with paraffins and inert towards anhydride groups, and dispersed in a continuous phase comprising a paraffin hydrocarbon, the volume ratio of continuous phase to disperse phase being between 2:1 and 5:1.

11. A process according to claim 3 in which the peptide solution is an enzyme solution having a pH of 5.5 to 9.0.

12. A process according to claim 8 in which the copolymer is reacted with an aqueous penicillinacylase solution at pH 5.7 to 6.8.

13. A process according to claim 12 in which the salt content of the aqueous penicillinacylase solution is not more than 0.2 mol/liter.

14. A process for carrying out an enzyme-catalyzed conversion of a substrate comprising contacting a preparation of an enzyme bound to a crosslinked copolymer according to claim 8 with a substrate for the enzyme under conditions where the said conversion occurs.

15. A process according to claim 14 in which the said conversion is a hydrolytic splitting.

16. A process according to claim 15 in which the substrate is a penicillin, the enzyme is penicillinacylase, and the conversion is a hydrolytic splitting of the penicillin to give 6-aminopenicillanic acid.

17. A process according to claim 16 in which the penicillin is in the form of an aqueous solution containing 75,000 to 150,000 IU/ml of penicillin and having a pH of about 7.8.

18. A preparation according to claim 5 in which the enzyme is asparaginase.

19. A preparation according to claim 5 in which the enzyme is elastase.

20. A preparation according to claim 5 in which the enzyme is urease.

21. A preparation according to claim 5 in which the enzyme is trypsin.

22. A preparation according to claim 1 in which the peptide material is penicillinacylase and the copolymer comprises tetraethylene glycol dimethacrylate and maleic anhydride.

23. A preparation according to claim 1 in which the peptide material is penicillinacylase and the copolymer comprises ethylene glycol dimethacrylate and maleic anhydride.

24. A preparation according to claim 1 in which the peptide material is asparaginase and the copolymer comprises ethylene glycol dimethacrylate and maleic anhydride.

25. A preparation according to claim 1 in which the peptide material is elastase and the copolymer comprises diethylene glycol dimethacrylate and maleic anhydride.

26. A preparation according to claim 1 in which the peptide material is urease and the copolymer comprises diethylene glycol dimethacrylate and maleic anhydride.

27. A preparation according to claim 1 in which the peptide material is trypsin and the copolymer comprises tetraethylene glycol dimethacrylate and maleic anhydride.

28. A preparation according to claim 1 in which the peptide material is elastase and the copolymer comprises tetraethylene glycol dimethacrylate and maleic anhydride.

* * * * *

UNITED STATES PATENT OFFICE
CERTIFICATE OF CORRECTION

Patent No. 3,910,825                Dated October 7, 1975

Inventor(s) Fritz Huper et al

It is certified that error appears in the above-identified patent and that said Letters Patent are hereby corrected as shown below:

Column 5, line 53, insert --above-- after "described".

Column 6, line 20, "proetin" should be --protein--.

Column 7, line 13, change "acrylases" to --acylases--.

Column 9, line 53, delete "Ser. No."

Column 9, line 54, "345,542" should be --345,452--.

Column 10, line 4, "is benzene" should be --in benzene--.

Column 10, line 20, "content" should be --constant--.

Column 10, line 30, "NIPAS" should be --NIPAB--.

Column 13, line 26, insert a hyphen -- - -- between "100°" and "140°C".

Column 13, line 61, delete "2 hours at 90°C" and insert --2 hours at 75°C and 1.5 hours at 90°C--.

Column 16, line 13, Claim 11, "3" should be --8--.

Signed and Sealed this fourth Day of May 1976

[SEAL]

Attest:

RUTH C. MASON
Attesting Officer

C. MARSHALL DANN
Commissioner of Patents and Trademarks